US011097393B2

(12) United States Patent
Chiu

(10) Patent No.: US 11,097,393 B2
(45) Date of Patent: Aug. 24, 2021

(54) PROTECTIVE APPARATUS FOR A MACHINE TOOL

(71) Applicant: Chih-Hui Chiu, Yilan County (TW)

(72) Inventor: Chih-Hui Chiu, Yilan County (TW)

( * ) Notice: Subject to any disclaimer, the term of this patent is extended or adjusted under 35 U.S.C. 154(b) by 134 days.

(21) Appl. No.: 16/413,672

(22) Filed: May 16, 2019

(65) Prior Publication Data

US 2019/0262958 A1 Aug. 29, 2019

Related U.S. Application Data

(63) Continuation-in-part of application No. 14/700,600, filed on Apr. 30, 2015, now abandoned.

(30) Foreign Application Priority Data

May 2, 2014 (TW) .................................. 103115877

(51) Int. Cl.

| B23Q 11/00 | (2006.01) |
| B23D 59/00 | (2006.01) |
| B23D 47/12 | (2006.01) |
| B27G 19/02 | (2006.01) |

(52) U.S. Cl.
CPC .......... *B23Q 11/0092* (2013.01); *B23D 47/12* (2013.01); *B23D 59/001* (2013.01); *B27G 19/02* (2013.01)

(58) Field of Classification Search
CPC ....................... B23Q 11/0078; B23Q 11/0092; B23D 47/00; B23D 47/12; B23D 47/123; B23D 47/126; B23D 59/001; B27G 19/00; B27G 19/02

USPC ...................................................... 83/58–63
See application file for complete search history.

(56) References Cited

U.S. PATENT DOCUMENTS

| 182,178 A | * | 9/1876 | Disston | ................ | B23D 61/025 |
| | | | | | 83/838 |
| 411,189 A | * | 9/1889 | Grey | .................... | B23D 61/025 |
| | | | | | 83/838 |
| 3,675,526 A | * | 7/1972 | Bush | ........................ | B27B 9/02 |
| | | | | | 83/676 |

(Continued)

*Primary Examiner* — Stephen Choi
*Assistant Examiner* — Richard D Crosby, Jr.
(74) *Attorney, Agent, or Firm* — Li & Cai Intellectual Property (USA) Office

(57) ABSTRACT

A protective apparatus and a machine tool are provided. The machine tool includes an operational element, a driving element, and the protective apparatus. The operational element and the driving element are disposed on machine table. The protective apparatus includes an insulating unit, conducting unit, capacitance sensor, and control unit. The insulating unit is disposed between the operational element and the driving element. The driving element drives the operational element by the insulating unit. The conducting unit contacts the operational element. The capacitance sensor electrically connects the conducting unit for sensing capacitance of the conducting unit. The control unit electrically connects the capacitance sensor and the driving element and determines whether a user approaches the operational element based on the capacitance. When the control unit detects that the distance between the user and the operational element is too close, the control unit stops the operation of the operational element.

12 Claims, 16 Drawing Sheets

(56) References Cited

U.S. PATENT DOCUMENTS

| | | | | |
|---|---|---|---|---|
| 3,785,230 A * | 1/1974 | Lokey | ................ | B27B 5/38 30/388 |
| 4,026,177 A * | 5/1977 | Lokey | ................ | B23D 61/026 83/835 |
| 5,081,406 A * | 1/1992 | Hughes | ................ | B23D 59/005 318/478 |
| 6,366,099 B1 * | 4/2002 | Reddi | ................ | G01R 27/2605 324/658 |
| 6,853,300 B2 * | 2/2005 | Kuan | ................ | B23D 59/001 340/545.2 |
| 7,055,417 B1 * | 6/2006 | Gass | ................ | B23D 59/001 83/477.1 |
| 2002/0017176 A1 * | 2/2002 | Gass | ................ | B23D 59/001 83/13 |
| 2002/0017336 A1 * | 2/2002 | Gass | ................ | B27B 5/38 144/2.1 |
| 2003/0117023 A1 * | 6/2003 | Avril | ................ | F16P 3/147 307/39 |
| 2003/0131703 A1 * | 7/2003 | Gass | ................ | B23Q 11/0082 83/62.1 |
| 2004/0123709 A1 * | 7/2004 | Metzger | ................ | B23D 59/001 83/76.1 |
| 2004/0194594 A1 * | 10/2004 | Dils | ................ | B27G 19/02 83/13 |
| 2004/0226424 A1 * | 11/2004 | O'Banion | ................ | B27B 5/32 83/397 |
| 2004/0226800 A1 * | 11/2004 | Pierga | ................ | B23D 59/001 192/129 R |
| 2005/0145080 A1 * | 7/2005 | Voigtlaender | ................ | B27G 19/00 83/58 |
| 2005/0166736 A1 * | 8/2005 | Gass | ................ | B23D 45/067 83/477.2 |
| 2009/0266207 A1 * | 10/2009 | Chiu | ................ | B27G 19/02 83/61 |
| 2010/0018830 A1 * | 1/2010 | Krapf | ................ | G01S 7/411 192/129 A |
| 2010/0147124 A1 * | 6/2010 | Seidel | ................ | B23Q 17/2438 83/72 |
| 2011/0308365 A1 * | 12/2011 | Chiu | ................ | F16P 3/145 83/62.1 |
| 2012/0090439 A1 * | 4/2012 | Butler | ................ | B27G 19/02 83/68 |
| 2013/0152752 A1 * | 6/2013 | Cappellari | ................ | F16P 3/148 83/58 |
| 2014/0260861 A1 * | 9/2014 | Doumani | ................ | B27G 19/02 83/399 |
| 2014/0290455 A1 * | 10/2014 | Gass | ................ | B27G 19/06 83/62.1 |
| 2015/0075343 A1 * | 3/2015 | Butler | ................ | B27B 5/222 83/62 |

* cited by examiner

PROTECTIVE APPARATUS FOR A MACHINE TOOL

CROSS-REFERENCE TO RELATED PATENT APPLICATION

This application is a continuation-in-part application of and claims the priority benefit of a prior application Ser. No. 14/700,600, filed on Apr. 30, 2015, now pending, which claims the priority benefits of Taiwan application serial no. 103115877, filed on May 2, 2014. The entirety of each of the above patent applications is hereby incorporated by reference herein and made a part of this specification.

BACKGROUND

1. Technical Field

The present disclosure relates to a protective apparatus for a machine tool, in particular, to a protective apparatus for a machine tool for preventing an operational element of the machine tool in operation from harming the user.

2. Description of Related Art

In cutting tools, the machine tool is one that easily can cut the user in operation, especially the machine tool for cutting wood. Either the professional technician or the do-it-yourself person easily gets hurt by using the machine tool. In order to increase the safety of using the machine tool, the traditional machine tool is configured with the protective apparatus.

Regarding the protective apparatus of the machine tool, one method is a clear shield installed around the machine tool to avoid the distance between the user and a saw blade configured in the machine tool getting too close. Another method is a security sensor installed around the machine tool to stop the operation of the machine tool when the distance between the user and the saw blade configured in the machine tool gets too close. However, the security sensor has many blind spots for sensing, causing safety problems for the user because of the sensing failure. Therefore, the protective method of installing the security sensor around the machine tool easily causes the industrial safety problem.

SUMMARY

The present disclosure provides a protective apparatus adapted for a machine tool. The machine tool includes a driving element and a saw blade, the driving element used for driving the saw blade. The protective apparatus includes an insulating unit, a conducting unit, a capacitance sensor and a control unit. The insulating unit is configured between the saw blade and the driving element, and the driving element driving the saw blade through the insulating unit. The conducting unit is in direct contact with the saw blade. The capacitance sensor is electrically connected to the conducting unit. The control unit is electrically connected to the capacitance sensor and the driving element. Before the saw blade is driven by the driving element, the protective apparatus operates in a correction mode, the control unit outputs a first prompting signal for prompting a user to place his or her hand in a front correction region located in front of saw teeth of the saw blade. The capacitance sensor obtains a reference capacitance. The capacitance sensor senses a first capacitance of the conducting unit that is generated when the user's hand is in the front correction region without contacting with the saw blade. The control unit calculates a capacitance threshold according to the reference capacitance and the first capacitance, the capacitance threshold is larger than the reference capacitance and smaller than the first capacitance. When the saw blade is driven by the driving element, the conducting unit maintains contact with the saw blade, the user moves his or her hand toward the saw teeth of the saw blade for cutting an object, the protective apparatus enters a protection mode, the capacitance sensor senses a practical capacitance of the conducting unit, the control unit compares the practical capacitance and the capacitance threshold. When the control unit determines that the practical capacitance is larger than the capacitance threshold, the control unit controls the driving element to stop driving the saw blade.

In addition, the present disclosure provides a machine tool includes a saw blade, a driving element and a protective apparatus. The saw blade is configured to a machine table. The driving element is configured to the machine table and used for driving the saw blade. The protective apparatus includes an insulating unit, a conducting unit, a capacitance sensor and a control unit. The insulating unit is configured between the saw blade and the driving element, and the driving element driving the saw blade through the insulating unit. The conducting unit is in direct contact with the saw blade. The capacitance sensor is electrically connected to the conducting unit. The control unit is electrically connected to the capacitance sensor and the driving element. Before the saw blade is driven by the driving element, the protective apparatus operates in a correction mode, the control unit outputs a first prompting signal for prompting a user to place his or her hand in a front correction region located in front of saw teeth of the saw blade. The capacitance sensor obtains a reference capacitance. The capacitance sensor senses a first capacitance of the conducting unit that is generated when the user's hand is in the front correction region without contacting with the saw blade. The control unit calculates a capacitance threshold according to the reference capacitance and the first capacitance. The capacitance threshold is larger than the reference capacitance and smaller than the first capacitance. When the saw blade is driven by the driving element, the conducting unit maintains contact with the saw blade, the user moves his or her hand toward the saw teeth of the saw blade for cutting an object, the protective apparatus enters a protection mode, the capacitance sensor senses a practical capacitance of the conducting unit, the control unit compares the practical capacitance and the capacitance threshold. When the control unit determines that the practical capacitance is larger than the capacitance threshold, the control unit controls the driving element to stop driving the saw blade.

In addition, the present disclosure provides a protective apparatus adapted for a machine tool. The machine tool includes a driving element and a saw blade, the driving element used for driving the saw blade. The protective apparatus includes an insulating unit, a conducting unit, a capacitance sensor and a control unit. The insulating unit is configured between the saw blade and the driving element, and the driving element driving the saw blade through the insulating unit. The conducting unit is in direct contact with the saw blade. The capacitance sensor is electrically connected to the conducting unit. The control unit is electrically connected to the capacitance sensor and the driving element. Before the saw blade is driven by the driving element and when a hand of the user is in contact with the saw blade, the capacitance sensor senses a reference capacitance of the conducting unit. Before the saw blade is driven by the driving element and when the hand of the user is not in contact with the saw blade, the protective apparatus operates in a correction mode, the control unit outputs a first prompting signal for prompting the user to place his or her hand in a front correction region located in front of saw teeth of the saw blade, the capacitance sensor obtains a reference capacitance and senses a first capacitance of the conducting unit that is generated when the user's hand is in the front correction region without contacting with the saw blade, the control unit calculates a capacitance threshold according to the reference capacitance and the first capacitance, the capacitance threshold being larger than the reference capacitance and smaller than the first capacitance. When the saw blade is driven by the driving element, the conducting unit maintains contact with the saw blade, the user moves his or her hand toward the saw teeth of the saw blade for cutting an object, the protective apparatus enters a protection mode, the capacitance sensor senses a practical capacitance of the conducting unit, the control unit compares the practical capacitance and the capacitance threshold. When the control unit determines that the practical capacitance is larger than the capacitance threshold, the control unit controls the driving element to stop driving the saw blade.

In addition, the present disclosure provides a protective method for controlling operation of a machine tool by using a protective apparatus. The protective apparatus includes an insulating unit, a conducting unit, a capacitance sensor and a control unit. The insulating unit is configured between the saw blade and the driving element. The conducting unit is in direct contact with the saw blade. The capacitance sensor is electrically connected to the conducting unit. The control unit is electrically connected to the capacitance sensor and the driving element. The machine tool includes a driving element and a saw blade used for driving the saw blade. The protective method includes the following steps: providing the protective apparatus that operates in a correction mode before the saw blade is driven by the driving element; outputting a first prompting signal for prompting a user to place his or her hand in a front correction region located in front of saw teeth of the saw blade by the control unit; obtaining a reference capacitance by the capacitance sensor; sensing a first capacitance of the conducting unit that is generated when the hand of the user is in the front correction region without contacting with the saw blade by the capacitance sensor; calculating a capacitance threshold according to the reference capacitance and the first capacitance by the control unit, wherein the capacitance threshold is larger than the reference capacitance and smaller than the first capacitance; controlling the driving element to drive the saw blade by the control unit while making the conducting unit be in direct contact with the saw blade; switching the protective apparatus to operate in a protection mode; sensing a practical capacitance of the conducting unit that is generated when the user moves his or her hand toward the saw teeth of the saw blade for cutting an object by the capacitance sensor; and determining whether or not the practical capacitance is larger than the capacitance threshold by the control unit, in response to determining that the practical capacitance is not larger than the capacitance threshold, continually controlling the driving element to drive the saw blade by the control unit, in response to determining that the practical capacitance is larger than the capacitance threshold, controlling the driving element to stop driving the saw blade.

To sum up, the exemplary embodiments of the present disclosure provide a protective apparatus and a machine tool, which can avoid that a capacitance sensor has blind spots for sensing, to enhance the security for the user using the machine tool.

In order to further understand the techniques, means and effects of the present disclosure, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1A:
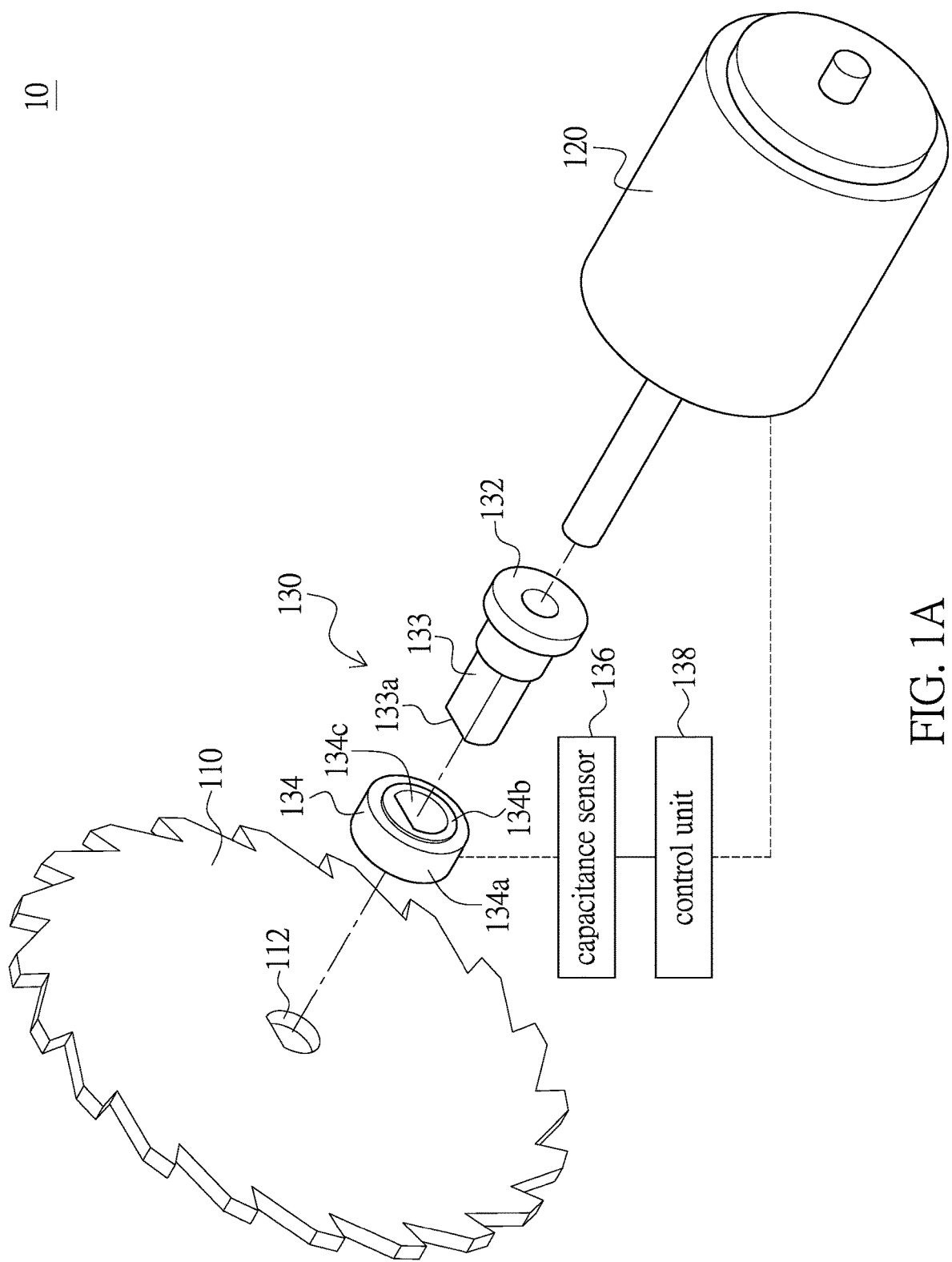
FIG. 1A is an explosion diagram of a protective apparatus applied to a machine tool according to a first exemplary embodiment of the present disclosure.

Reference will now be made in detail to the exemplary embodiments of the present disclosure, examples of which are illustrated in the accompanying drawings. Wherever possible, the same reference numbers are used in the drawings and the description to refer to the same or like parts.

The present disclosure provides a protective apparatus and a machine tool. In the protective apparatus and the machine tool of the present disclosure, a conducting unit and an operational element are electrically connected with each other, so that a capacitance sensor can detect whether a user approaches the operational element. When the capacitance sensor detects that the distance between the user and the operational element is too close, the protective apparatus stops the operation of the operational element. Compared with the security sensor installed around the machine tool, the capacitance sensor of the present disclosure does not have the blind spot problem for sensing because the capacitance sensor electrically connects to the operational element through the conducting unit. Therefore, when the user uses the machine tool, it can reduce the probability of harm.

Figure 1B:
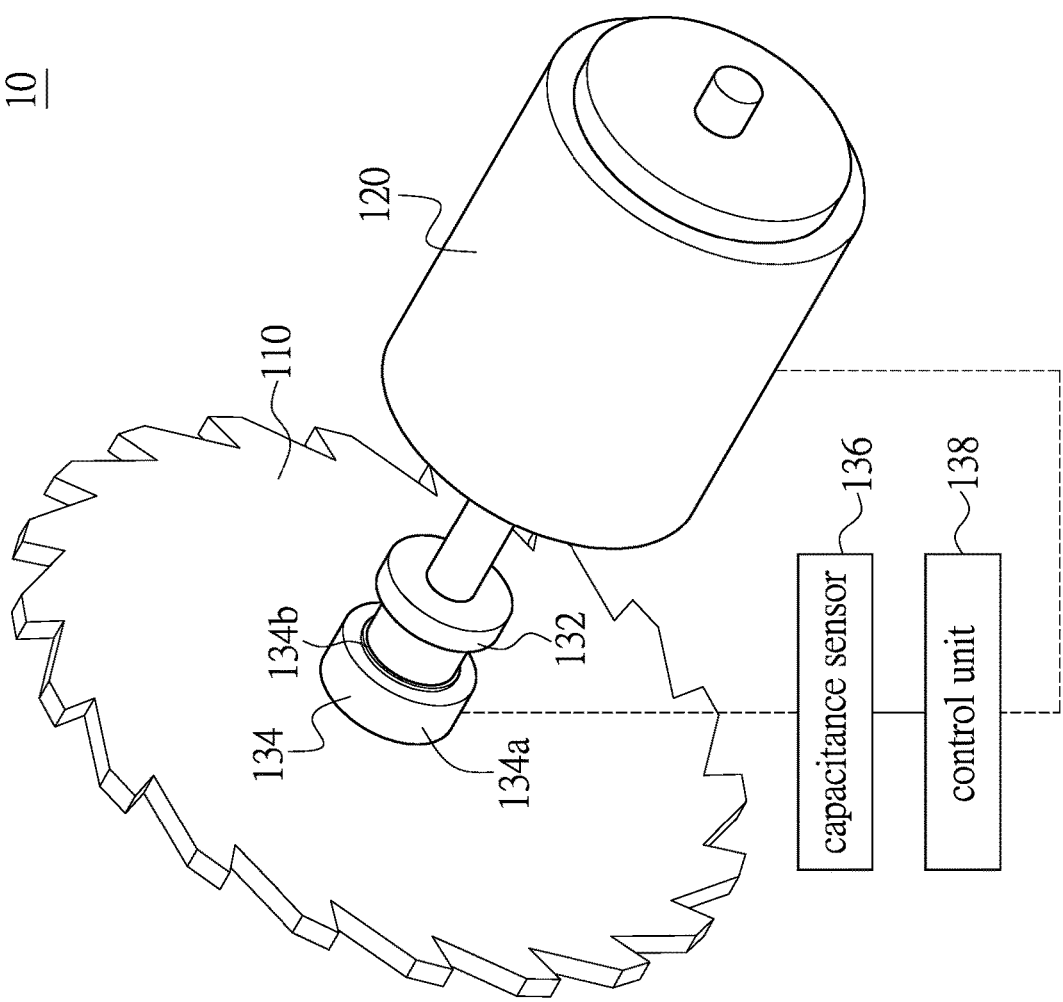
FIG. 1B is a structural diagram of a protective apparatus applied to a machine tool according to the first exemplary embodiment of the present disclosure.

Firstly, please refer to FIGS. 1A and 1B, which respectively show an explosion diagram and a structural diagram of a protective apparatus applied to a machine tool according to a first exemplary embodiment of the present disclosure.

Figure 1C:
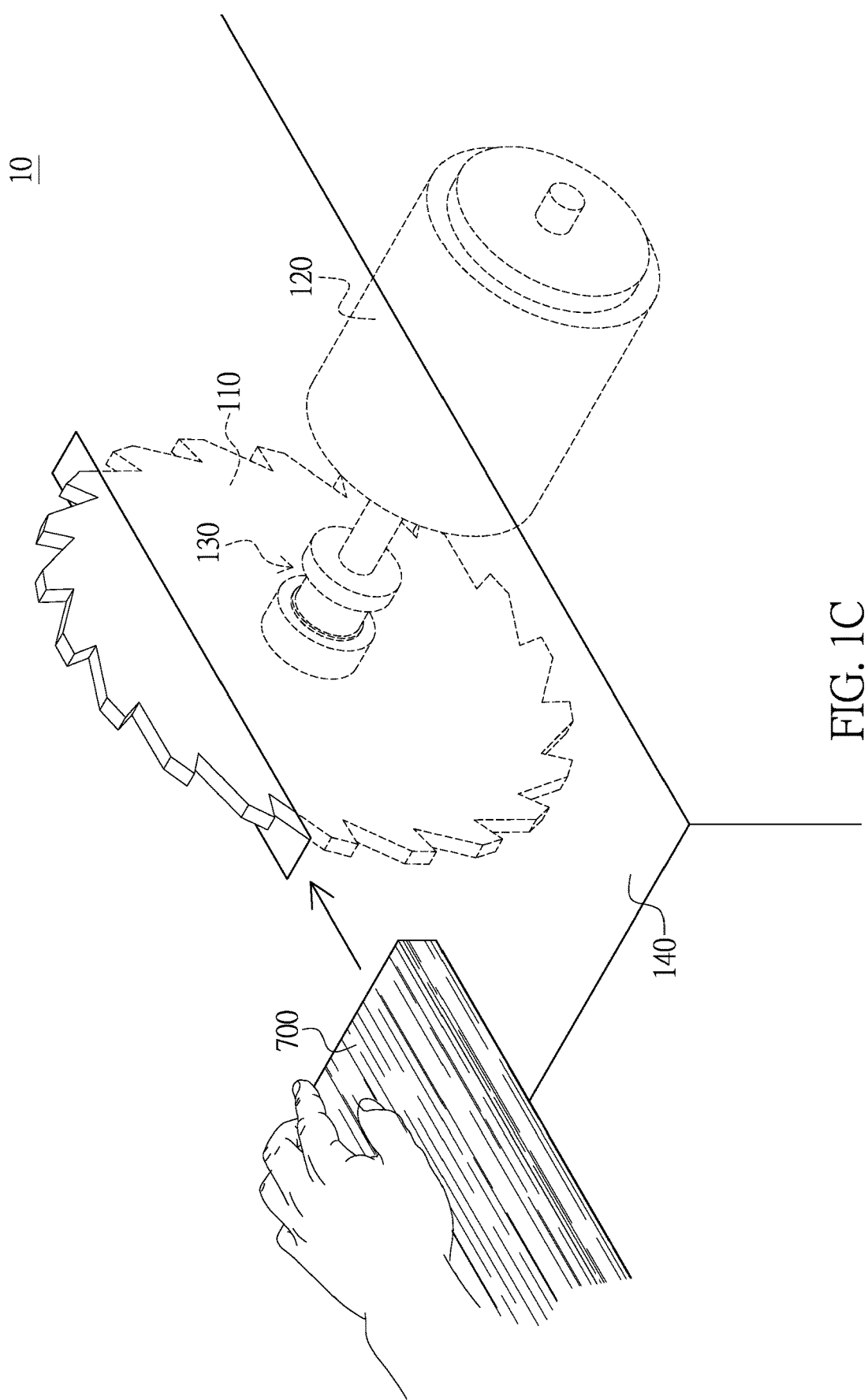
FIG. 1C is a diagram of user operating a machine tool to cut a wood according to the first exemplary embodiment of the present disclosure.

As shown in FIGS. 1A and 1B, the machine tool 10 includes an operational element 110, a driving element 120, and a protective apparatus 130. The operational element 110 and the driving element 120 are configured on a machine table (as the machine table 140 shown in FIG. 1C). The operational element 110 can be a saw blade, a grinding wheel blade, or other type operational element. The driving element 120 can be a motor or other driving element which can work the operational element 110. The present disclosure is not limited thereto. In the present disclosure, the operational element 110 is a saw blade, and the driving element 120 is a motor. Therefore, as shown in FIG. 1C, the user can use the machine tool 10 to work the saw blade through driving the motor, and accordingly cut an object to be sawed 700 (e.g., wood) on the machine table 140, so that the object to be sawed 700 is cut to a suitable shape.

The protective apparatus 130 includes an insulating unit 132, a conducting unit 134, a capacitance sensor 136, and a control unit 138. The insulating unit 132 is configured between the operational element 110 and the driving element 120, then the driving element 120 drives the operational element 110 through the insulating unit 132. This means that the driving element 120 operates to work the insulating unit 132 and the operational element 110. For example, the driving element 120 is a motor and the operational element 110 is a saw blade. The saw blade and the insulating unit 132 are configured on a drive shaft of the motor. The insulating unit 132 is configured between the drive shaft and the saw blade, so that the drive shaft is insulated from the saw blade. At this point, the operation of the drive shaft can work the insulating unit 132 and the saw blade.

The conducting unit 134 contacts the operational element 110. In the present disclosure, the conducting unit 134 is a bearing and sleeves around the insulating unit 132. The conducting unit 134 has a holding portion 134a and a linking portion 134b configured to the holding portion 134a. The linking portion 134b contacts the operational element 110. The holding portion 134a electrically connects to the capacitance sensor 136. The linking portion 134b of the conducting unit 134 is fixed to the insulating unit 132, so that the insulating unit 132 is configured between the conducting unit 134 and the driving element 120, to cause the conducting unit 134 to be insulated from the driving element 120. Therefore, when the driving element 120 operates to work the insulating unit 132, the linking portion 134b, and the operational element 110, the holding portion 134a of the conducting unit 134 is immobile. In other disclosures, the conducting unit 134 is, for example, a ball bearing and sleeves around the insulating unit 132. When the driving element 120 operates to rotate the linking portion 134b of the ball bearing, the holding portion 134a of the ball bearing is immobile.

In the present disclosure, the insulating unit 132 has a concave portion 133 and the concave portion 133 has a positioning end 133a. In addition, the conducting unit 134 has a through-hole 134c corresponding to the shape of the concave portion 133, and the operational element 110 has a through-hole 112 corresponding to the shape of the concave portion 133. Therefore, the concave portion 133 of the insulating unit 132 can be configured through the through-hole 134c of the conducting unit 134 and the through-hole 112 of the operational element 110, so that the conducting unit 134 and the operational element 110 align the positioning end 133a of the concave portion 133. Therefore, the linking portion 134b of the conducting unit 134 and the operational element 110 can be fixed to the concave portion 133 of the insulating unit 132. The linking portion 134b of the conducting unit 134 electrically connected to the operational element 110 does not fall off from the insulating unit 132 easily.

The capacitance sensor 136 electrically connects to the conducting unit 134 to sense the capacitance of the conducting unit 134. The control unit 138 electrically connects between the capacitance sensor 136 and the driving element 120. At present, because the capacitance sensor 136 electrically connects to the operational element 110 through the conducting unit 134, the capacitance sensor 136 can detect the capacitance of the conducting unit 134 to determine whether an electric conductor approaches the operational element. This means that when the electric conductor (e.g., the user's hand) gradually approaches the operational element 110, the capacitance of the conducting unit 134 increases gradually. Next, the capacitance sensor 136 determines whether the capacitance is more than a predefined value. When the capacitance sensor 136 determines that the capacitance is more than the predefined value, the distance between the electric conductor (e.g., the user's hand) and the operational element 110 is too close. At this time, the capacitance sensor 136 generates a stop signal to the control unit 138. Then the control unit 138 controls the driving element 120 to stop driving the operational element 120 according to the stop signal, so that the insulating unit 132, the linking portion 134b, and the operational element 110 stop work.

Accordingly, the capacitance of the conducting unit 134 easily suffers from the interference of external conductors, e.g., the driving element 120 of the present disclosure, the motor, or etc. Therefore, the insulating unit 132 is configured between the operational element 110 and the driving element 120, and the conducting unit 134 is configured to the insulating unit 132. Therefore, the insulating unit 132 separates the driving element 120, so that the conducting unit 134 is insulated from the driving element 120 and the operational element 110 is insulated from the driving element 120, to avoid the electric power property of the driving element 120 in operation affecting the inducing capacitance between the operational element 110 and the conducting unit 134. Therefore, the capacitance sensor 136 can detect the more accurate capacitance.

Next, the control unit 138 turns off the switch of the driving element 120 according to the stop signal, to stop the operation of the driving element 120. Then when the capacitance sensor 136 determines that the capacitance of the conducting unit 134 is less than or equally to the predefined value, the control unit 138 restarts the driving element 120, to re-operate the switch of the driving element 120. In the present disclosure, the control unit 138 may be wired or wirelessly connect to the driving element 120 in a direct or indirect manner, and the present embodiment is not limited thereto.

Figure 1D:
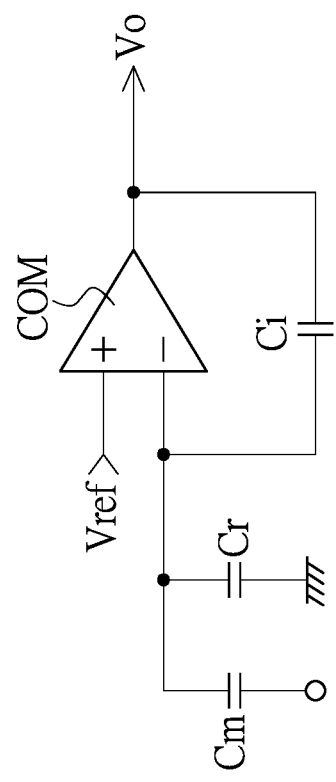
FIG. 1D is a circuit diagram of a capacitance sensor according to the first exemplary embodiment of the present disclosure.

In addition, in the present disclosure, the circuit structure of the capacitance sensor 136 can be implemented by an integrator. As shown in FIG. 1D, the capacitance sensor 136 includes a comparator COM and a feedback capacitance Ci. The positive input end (+) of the comparator COM receives a reference voltage Vref indicating the predefined value. The feedback capacitance Ci is connected between the negative input end (−) and the output end of the comparator COM. Furthermore, the negative input end (−) of the comparator COM receives the equivalent capacitance Cr and the mutual capacitance Cm. An end of the equivalent capacitance Cr electrically connects to the negative input end (−) of the comparator COM, and another end of the equivalent capacitance Cr connects to ground. An end of the mutual capacitance Cm electrically connects to the negative input end (−) of the comparator COM, and another end of the mutual capacitance Cm electrically connects to the operational element 110. The equivalent capacitance Cr and the mutual capacitance Cm are connected in parallel with each other.

Therefore, when the electric conductor (e.g., the user's hand) does not approach the operational element 110, the mutual capacitance Cm may sustain the fixed capacitance, and the negative input end (−) of the comparator COM receives the fixed value. When the electric conductor gradually approaches the operational element 110, the capacitance gradually increases. In addition, when the electric conductor gradually approaches the operational element 110 to a predefined distance, the received value of the negative input end (−) of the comparator COM is more than the reference voltage Vref, to generate an output signal Vo with low voltage level. This means that the capacitance sensor 136 determines that the capacitance is more than the predefined value, to generate the stop signal to the control unit 138. Next, the control unit 138 stops operating the driving element 120 according to the stop signal and then the linking portion 134b, the insulating unit 132, and the operational element 110 stop work, to avoid that the electric conductor (e.g., the user's hand) contacts the operational element 110 (e.g., the saw blade). The above circuit structure of the capacitance sensor 136 is described as an example, but another circuit structure of the capacitance sensor 136 may detect whether the distance between the electric conductor and the operational element 110 is too close. The present disclosure is not limited thereto.

In addition, because the operational element 110 has different sizes and types (e.g., the saw blade, the grinding wheel blade), the capacitance sensor 136 may sense different capacitance, causing the capacitance sensor 136 to determine inaccurate capacitance. For example, when the distance between the user's hand and the operational element 110 are too far, the capacitance sensor 136 still generates the stop signal to stop the operation of the driving element 120. Therefore, the capacitance sensor 136 further includes a capacitance adjusting unit (not shown in FIG. 1A). The capacitance adjusting unit is used for adjusting the predefined value, so that the capacitance sensor 136 can adjust the predefined value according to different sizes or types of the operational element 110, to determine the more accurate stop signal. More specifically, because the usage environment, the operational element 110, and the user are different, the capacitance sensor 136 can determine the sensing distance by adjusting the predefined value.

Therefore, as shown in FIG. 1C, when the user uses the operational element 110 to cut the object to be sawed 700 (e.g., wood) on the machine table 140 of the machine tool 10, the capacitance sensor 136 continuously determines whether the capacitance of the conducting unit 134 is more than the predefined value, to accordingly detect whether the user approaches the operational element 110. When the capacitance sensor 136 determines that the capacitance of the conducting unit 134 is more than the predefined value (i.e., the distance between the user and the operational element 110 is too close), the capacitance sensor 136 generates the stop signal to the control unit 138. The control unit 138 stops operating the driving element 120 according to the stop signal, and then the linking portion 134b, the insulating unit 132, and the operational element 110 stop work, to avoid the user being in direct contact with the operational element 110 and getting harmed.

Figure 2:
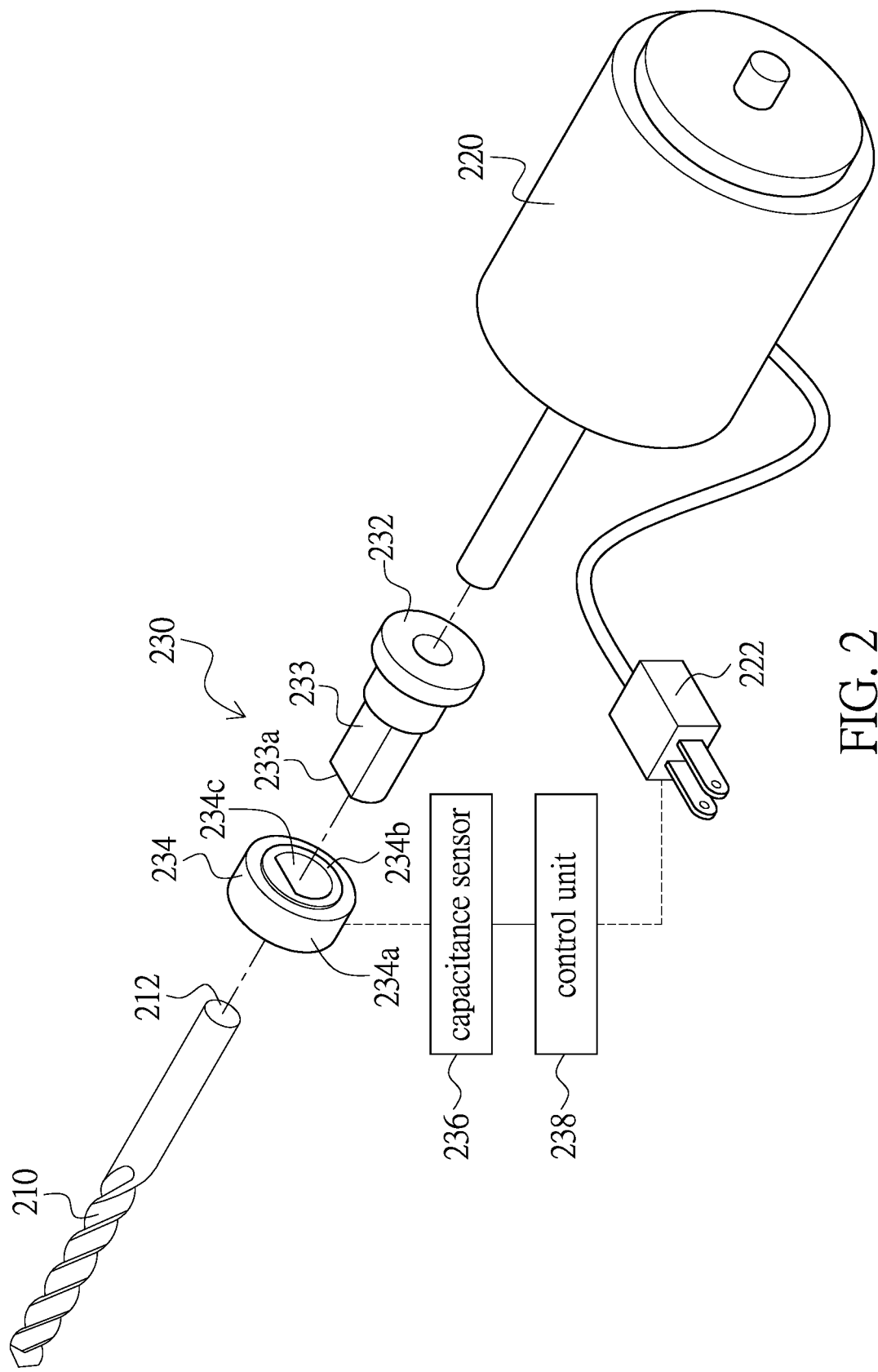
FIG. 2 is an explosion diagram of the machine tool according to another exemplary embodiment of the present disclosure.

Next, please refer to FIG. 2, which shows an explosion diagram of a machine tool according to another exemplary embodiment of the present disclosure. As shown in FIG. 2, the machine tool 20 includes an operational element 210, a driving element 220, and a protective apparatus 230. The operational element 210 and the driving element 220 are configured on a machine table (not shown in FIG. 2). The operational element 210 can be a saw blade, a grinding wheel blade, or other type operational element. The driving element 220 can be a motor or other driving element which can work the operational element 210. The present disclosure is not limited thereto. In the present disclosure, the driving element 220 is a motor.

The protective apparatus 230 includes an insulating unit 232, a conducting unit 234, a capacitance sensor 236, and a control unit 238. The insulating unit 232 is configured between the operational element 210 and the driving element 220. Then the driving element 220 drives the operational element 210 through the insulating unit 232. This means that the driving element 220 operates to work the insulating unit 232 and the operational element 210.

The conducting unit 234 contacts the operational element 210. In the present disclosure, the conducting unit 234 is a bearing and sleeves around the insulating unit 232. The conducting unit 234 has a holding portion 234a and a linking portion 234b configured to the holding portion 234a. The linking portion 234b contacts the operational element 210. The holding portion 234a electrically connects to the capacitance sensor 236. In addition, the linking portion 234b of the conducting unit 234 is fixed to the insulating unit 232, so that the insulating unit 232 is configured between the conducting unit 234 and the driving element 220, to cause the conducting unit 234 to be insulated from the driving element 220. Therefore, when the driving element 220 operates to work the insulating unit 232, the linking portion 234b, and the operational element 210, the holding portion 234a of the conducting unit 234 is immobile. In other disclosures, the conducting unit 234 is, for example, a ball bearing and sleeves around the insulating unit 232. When the driving element 220 operates to rotate the linking portion 234b of the ball bearing, the holding portion 234a of the ball bearing is immobile.

In the present disclosure, the insulating unit 232 has a concave portion 233 and the concave portion 233 has a positioning end 233a. In addition, the conducting unit 234 has a through-hole 234c corresponding to the shape of the concave portion 233. Therefore, the concave portion 233 of the insulating unit 232 can be configured through the through-hole 234c of the conducting unit 234, so that the through-hole 234c of the conducting unit 234 aligns the positioning end 233a of the concave portion 233. Therefore, the linking portion 234b of the conducting unit 234 can be fixed to the concave portion 233 of the insulating unit 232, and does not fall off from the insulating unit 232 easily. The end portion 212 of the operational element 210 can be inserted and fixed into the hole (not shown in FIG. 2) of the insulating unit 232, and further descriptions are hereby omitted. It is worth to note that although the end portion 212 of the operational element 210 is fixed into the hole of the insulating unit 232, the operational element 210 is insulated from the driving element 220, the conducting unit 234 is insulated from the driving element 220, and the operational element 210 electrically contacts the linking portion 234b of the conducting unit 234. Therefore, the above connection relationships and operations can avoid the electric power property of the driving element 220 in operation affecting the inducing capacitance between the operational element 210 and the conducting unit 234.

The capacitance sensor 236 electrically connects to the conducting unit 234 to sense the capacitance of the conducting unit 234. The control unit 238 electrically connects between the capacitance sensor 236 and the driving element 220. With respect to operation of the capacitance sensor 236 and the control unit 238, it is the same as that of the capacitance sensor 136 and the control unit 138, so a detailed description is omitted. The difference is that the control unit 238 directly turns off the power 222 of the driving element 220 according to the stop signal, to stop the operation of the driving element 220. Therefore, when the capacitance sensor 236 determines that the capacitance of the conducting unit 234 is more that the predefined value, this means that the distance between the electric conductor (e.g., the user's hand) and the operational element 210 is too close. Then the capacitance sensor 236 generates the stop signal to the control unit 238. The control unit 238 directly turns off the power 222 of the driving element 220 according to the stop signal to stop operating the driving element 220, so that the insulating unit 232, the linking portion 234b, and the operational element 110 stop work.

Accordingly, the present embodiment in FIG. 2 needs to additionally design the turn on/off operation of the power of the driving element 220. The foregoing embodiment in FIG. 1A needs to additionally design the turn on/off operation of the switch of the driving element 120. Because the internal structure of the driving element 120 shown in FIG. 1A is more complex than that of the power 222 in the present embodiment, the turn on/off operation configured in the power 222 is easier than the turn on/off operation configured in the driving element 120 shown in FIG. 1A.

Figure 3A:
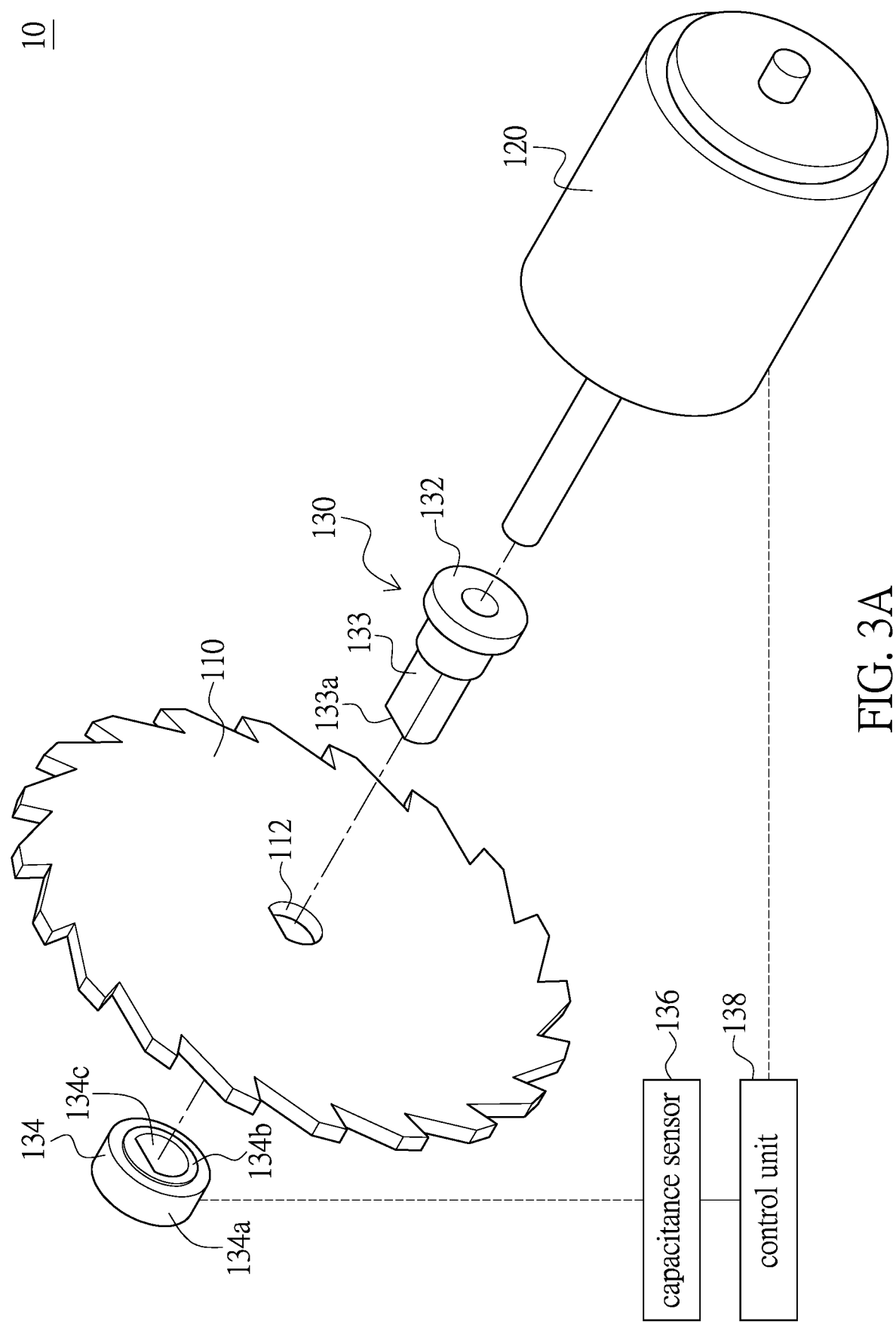
FIG. 3A is an explosion diagram of a protective apparatus applied to a machine tool according to a second exemplary embodiment of the present disclosure.
Figure 3B:
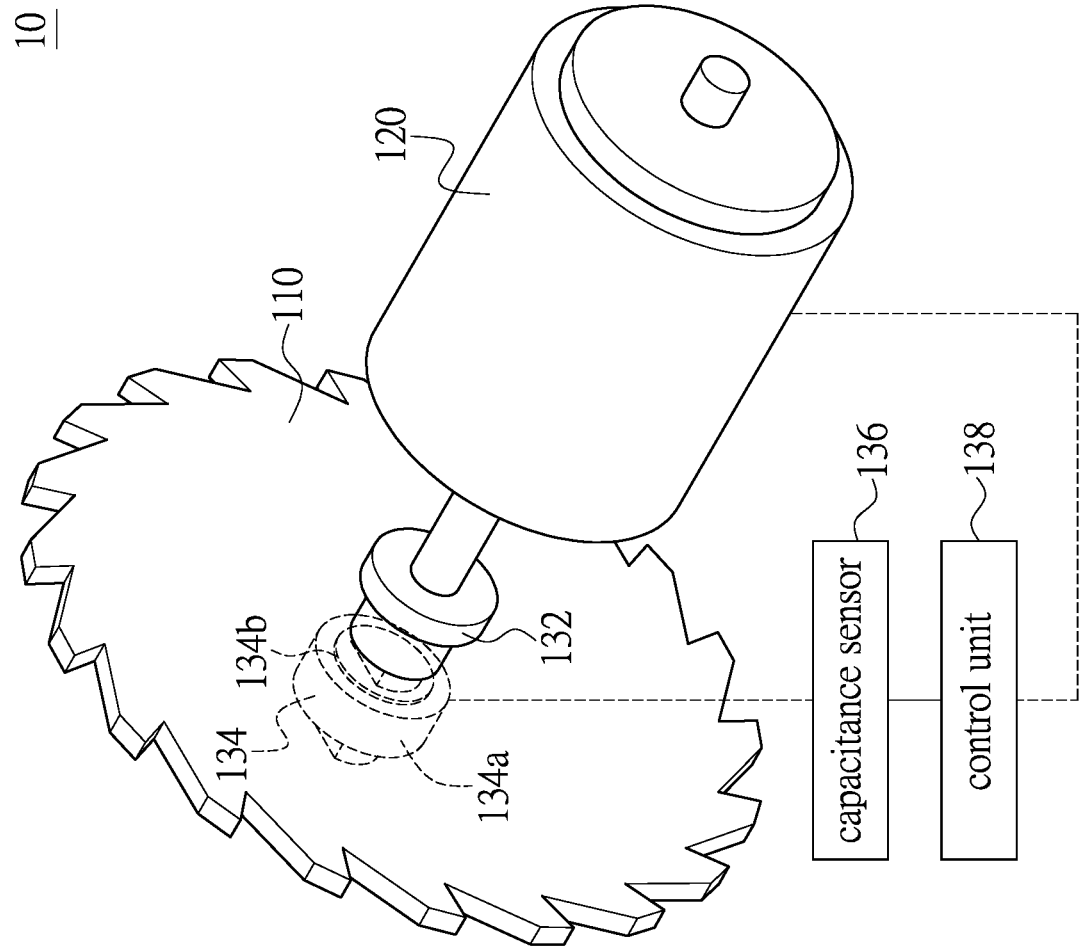
FIG. 3B is a structural diagram of the protective apparatus applied to the machine tool according to the second exemplary embodiment of the present disclosure.

Reference is made to FIGS. 3A and 3B, wherein FIG. 3A is an explosion diagram of a protective apparatus applied to a machine tool according to a second exemplary embodiment of the present disclosure; FIG. 3B is a structural diagram of the protective apparatus applied to the machine tool according to the second exemplary embodiment of the present disclosure.

As shown in FIG. 3A, the protective apparatus 130 includes the insulating unit 132, the conducting unit 134, the capacitance sensor 136 and the control unit 138. The machine tool includes the operational element 110 such as the saw blade in the embodiment, and the driving element 120.

Differences between the first and second exemplary embodiments are described in the following. As shown in FIG. 3A, in the second exemplary embodiment, the operational element 110 of the machine tool is provided between the conducting unit 134 of the protective apparatus and the driving element 120 of the machine tool. Therefore, the conducting unit 134 of the second exemplary embodiment can be more easily disassembled and replaced with a new one.

As shown in FIGS. 3A and 3B, the concave portion 133 of the insulating unit 132 is configured through the through-hole 112 of the operational element 110 and the through-hole 134c of the conducting unit 134. The conducting unit 134 is in direct contact with a surface of the operational element 110 opposite to the driving element 120.

The capacitance sensor 136 is electrically connected to the conducting unit 134 and configured to sense the capacitance of the conducting unit 134. The control unit 138 is electrically connected to the capacitance sensor 136 and the driving element 120, and configured to control the driving element 120 to rotate according to the sense capacitance.

In addition, the conducting unit 134 may include liquid mercury as a conductive medium. Therefore, noise generated by the conducting unit 134 is lower than that of the conventional element including a carbon brush.

Figure 3C:
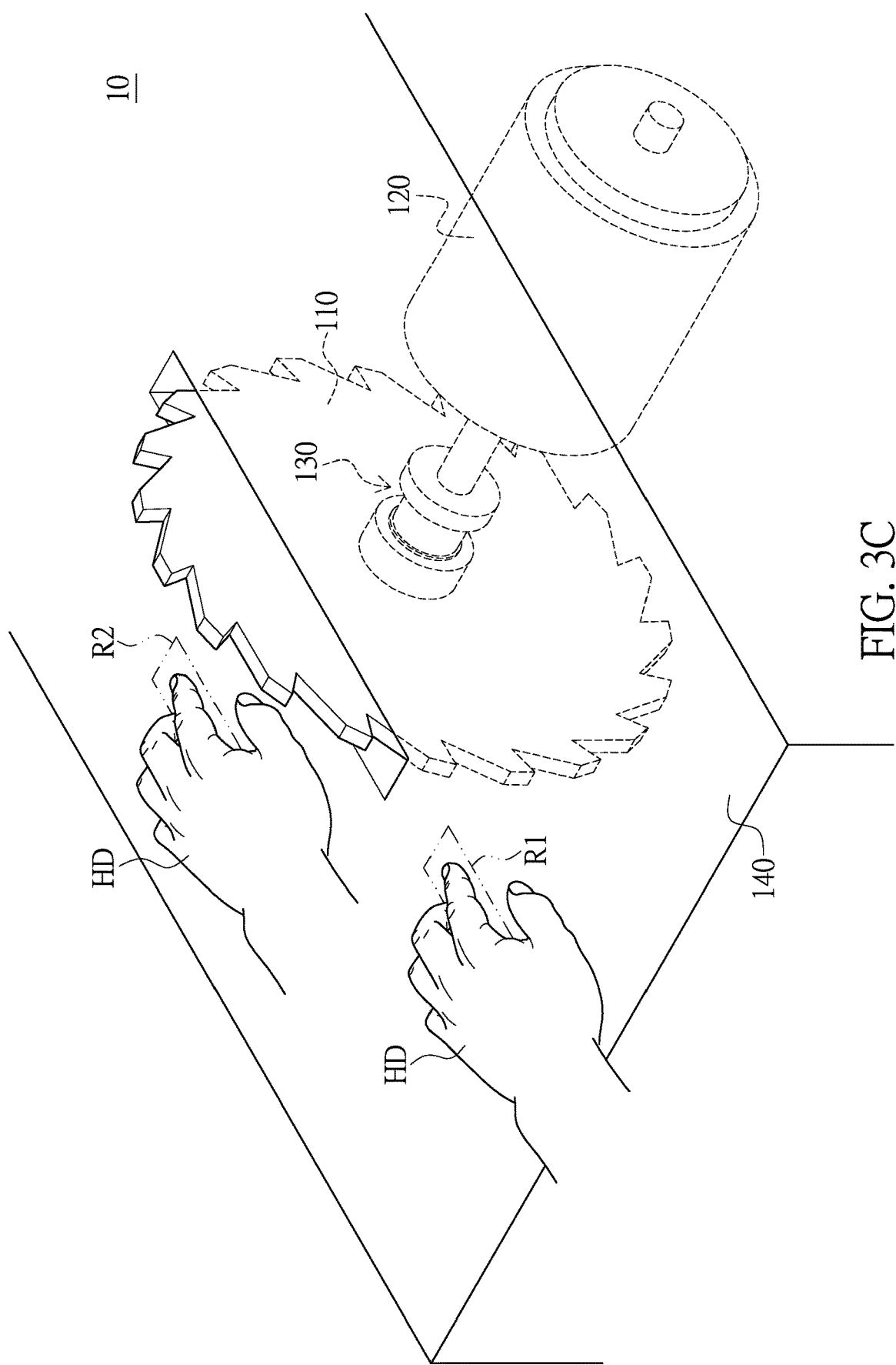
FIG. 3C is a diagram of the protective apparatus operating in a correction mode and being configured to a machine table having a front correction region and a side correction region on which the user places his or her hand according to the second exemplary embodiment of the present disclosure.

Reference is further made to FIG. 3C, which is a diagram of the protective apparatus operating in a correction mode and being configured to a machine table having a front correction region and a side correction region on which the user places his or her hand according to the second exemplary embodiment of the present disclosure.

As shown in FIG. 3C, a front correction region R1 is defined. The front correction region R1 is located near the saw teeth of the operational element 110 of the machine tool. In the embodiment, the front correction region R1 is located in front of the operational element 110. An object such as wood is to be cut by the saw teeth of the operational element 110.

In practice, if the object is to be cut by the machine tool is at a back side of the operational element 110, the front correction region R1 or other regions may be defined at the back side of the operational element 110.

Before the operational element 110 such as the saw blade is driven by the driving element 120, the protective apparatus operates in the correction mode.

The control unit 138 may include a control element and a promoting element. In the correction mode, the control element may control the promoting element to output a first prompting signal for prompting the user to place his or her hand in the front correction region R1 located in front of the saw teeth of the operational element 110 without contacting with the operational element 110. The first prompting signal outputted by the control unit 138 may be a visual signal and/or audio signal, but the present disclosure is not limited thereto.

As shown in FIG. 3A, the front correction region R1 is marked on the machine table 140. However, in practice, the front correction region R1 or other correction regions may not be marked. The first prompting signal outputted by the control unit 138 may prompt the user to place his or her hand on any position spaced from the saw teeth of the operational element 110 at a first distance.

The position at which the user places his or her hand is defined as the front correction region R1. If the first distance between the operational element 110 of the machine tool and the front correction region R1 in which the user places his or her hand is not equal to 0 cm, it means that the hand of the user in the front correction region R1 is not in contact with the operational element 110.

In detail, the first prompting signal outputted by the control unit 138 may prompt the user to place his or her hand on a position, which is spaced from the saw teeth of the operational element 110 at the first distance and spaced from the machine table 140 at a second distance. The second distance may depend on a height of the object to be cut by the operational element 110 of the machine tool. For example, the object may be the wood shown in FIG. 3D. If the second distance between the machine table 140 and the hand of the user is not equal to 0 cm, it means that the hand of the user in the front correction region R1 is not in contact with the machine table 140.

An area of the front correction region R1 may depend on a length and a width of a forefinger of a left hand or a right hand of the user. As shown in FIG. 3, the user places only a forefinger in the front correction region R1. In practice, the front correction region R1 may match a shape of the entire hand, and the user may place all his or her fingers in the front correction region R1.

The distance between the operational element 110 and the front correction region R1 may be larger than a first distance threshold and smaller than a second distance threshold. For example, the first distance threshold may be 0 cm and the second distance threshold may be a value larger than 0 cm, but the present disclosure is not limited thereto. The second distance threshold depends on a range in which the capacitance of the conducting unit 134 varies with the user's hands.

It is worth noting that, when the protective apparatus operates in the correction mode, the capacitance sensor 136 obtains a reference capacitance from the control unit 138 or an external circuit. Further, when the hand of the user is in the front correction region R1 without contacting with the operational element 110, the capacitance sensor 136 senses a first capacitance of the conducting unit 134.

The control unit 138 receives the first capacitance of the conducting unit 134 from the capacitance sensor 136. The control unit 138 then calculates a capacitance threshold according to the reference capacitance and the first capacitance. The control unit 138 may store the capacitance threshold. The capacitance threshold may be larger than the reference capacitance and smaller than the first capacitance.

In addition, as shown in FIG. 3C, a side correction region R2 is defined. In practice, the side correction region R2 may be omitted. The side correction region R2 is spaced from a surface of the body of the operational element 110 opposite to the driving element 120 at a third distance. The third distance between the surface of the body of the operational element 110 and the side correction region R2 may be or not be equal to the first distance between the operational element 110 and the front correction region R1.

The control unit 138 outputs a second prompting signal for prompting the user to place his or her hand in the side correction region R2 in the correction mode. When the hand is in the side correction region R2 without contacting with the operational element 110, the capacitance sensor 136 senses a second capacitance of the conducting unit 134. The control unit 138 calculates the capacitance threshold according to the reference capacitance, the first capacitance and second capacitance. The capacitance threshold is smaller than the second capacitance and the first capacitance and larger than the reference capacitance.

It should be understood that the front correction region R1 and the side correction region R2 may be defined in different positions in practice. The user may place his or her hand in different positions. The sensed first and second capacitances of the conducting unit 134 vary with a position of the hand of the user relative to the operational element 110.

Alternatively, more correction regions may be defined and located in positions different from the positions of the front correction region R1 and the side correction region R2. The user may place his or her hand sequentially on these correction regions. Under this condition, the capacitance sensor 136 may sequentially sense capacitances of the conducting unit 134 that may include the first capacitance and the second capacitance.

Figure 3D:
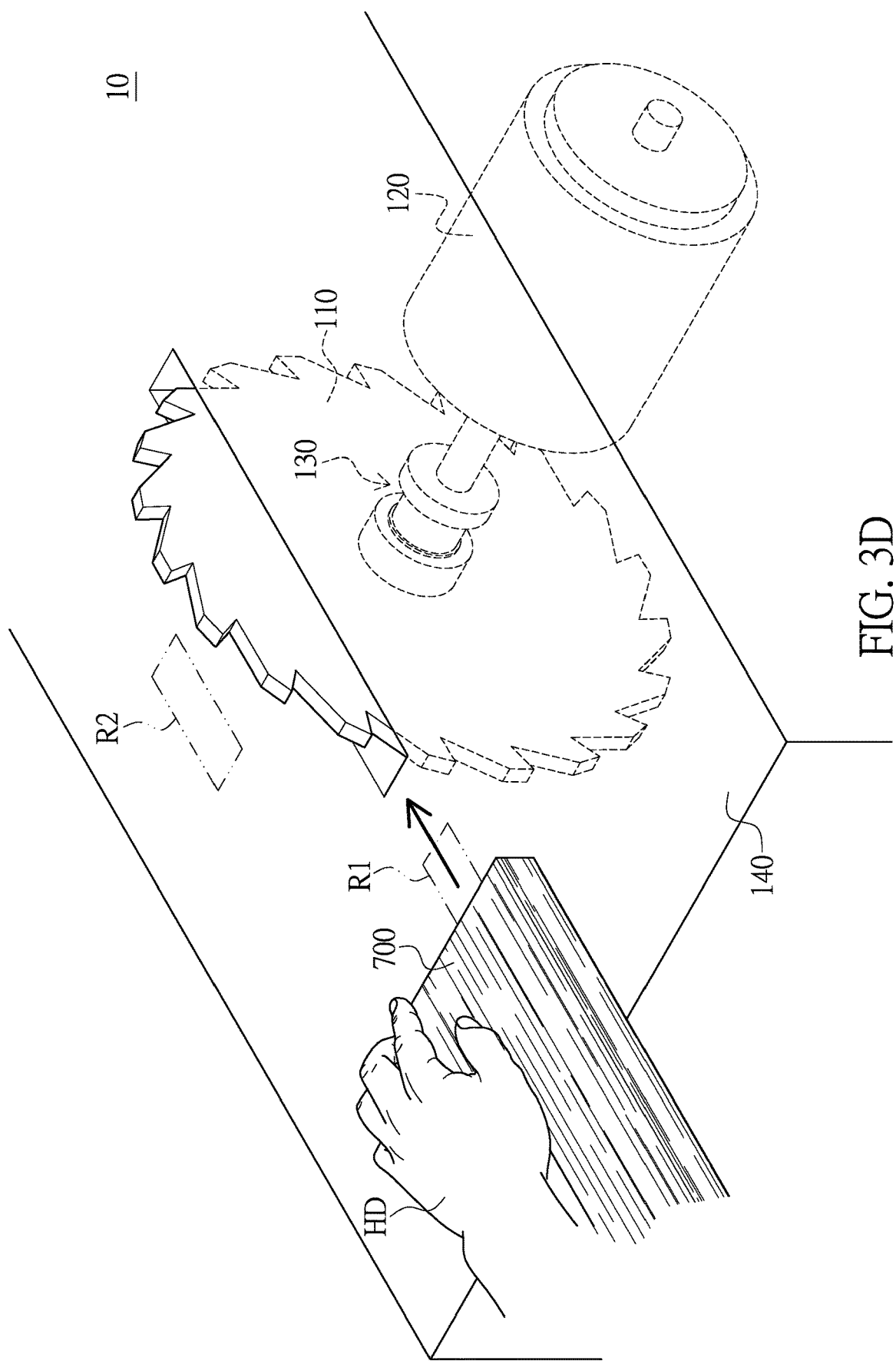
FIG. 3D is a diagram of the protective apparatus operating in a protection mode for protecting the user's hand from being injured by the machine tool cutting a wood.

Reference is further made to FIG. 3D, which is a diagram of the protective apparatus operating in a protection mode for protecting the user's hand from being injured by the machine tool cutting a wood.

As shown in FIGS. 3B and D, when the operational element 110 is driven by the driving element 120, the conducting unit 134 maintains contact with the surface of the operational element 110 opposite to the driving element 120, the protective apparatus enters the protection mode.

In the protection mode, the capacitance sensor 236 senses a practical capacitance of the conducting unit 134 that is generated when the user's hand holding and moving the object such as the wood to be cut toward the operational element 110 being driven by the driving element 120.

The practical capacitance of the conducting unit 134 may vary with the distance between the hand of the user and the operational element 110. The practical capacitance may include a capacitance of the operational element 110 and a capacitance of the hand of the user. When the user moves his or her hand to other positions, the capacitance sensor 236 may sense different practical capacitances of the conducting unit 134.

The control unit 138 compares the calculated capacitance threshold and the practical capacitance sensed when the object such as the wood is cut by the machine tool. It should be understood that the smaller the distance between the operational element 110 and the hand of the user is, the larger the sensed practical capacitance is.

When the control unit 138 determines that the practical capacitance is larger than the capacitance threshold, the control unit 138 determines that the user is too close to the operational element 110. Under this condition, the control unit 138 controls the driving element 120 of the machine tool to stop driving the operational element 110 of the machine tool before the user contacts with the operational element 110. Therefore, the protective apparatus can prevent the user from being injured by contact with the operational element 110 being driven by the driving element 120.

Figure 4A:
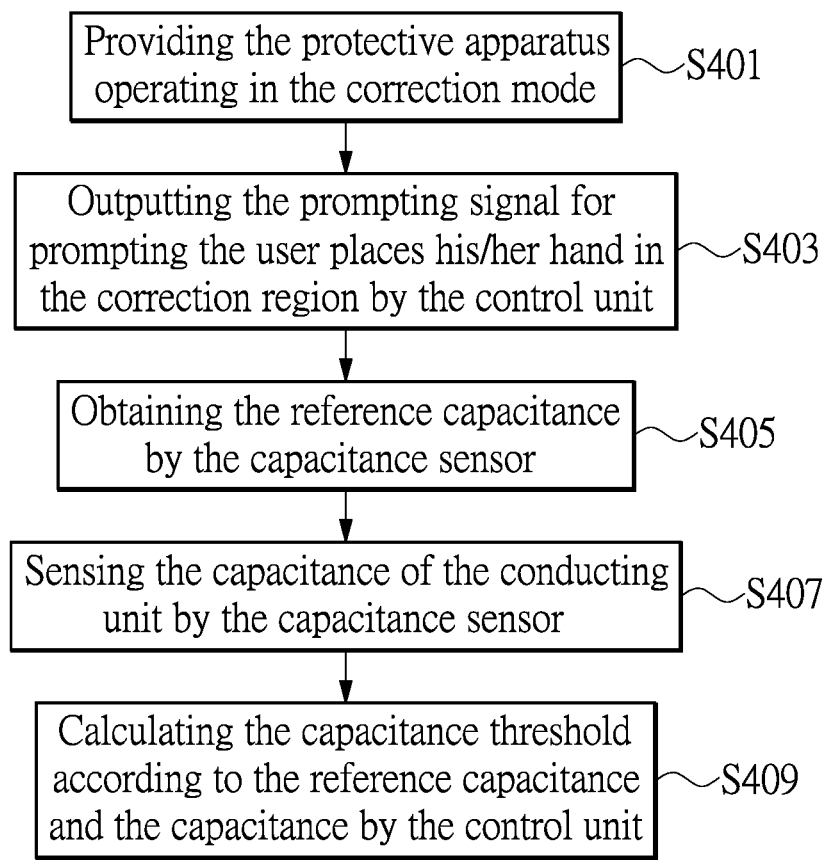
FIG. 4A is a flowchart diagram of a protective method for controlling operation of a machine tool by using a protective apparatus in a correction mode according to a third exemplary embodiment of the present disclosure.

Reference is made to FIG. 4A, which is a flowchart diagram of a protective method for controlling operation of a machine tool by using a protective apparatus in a correction mode according to a third exemplary embodiment of the present disclosure.

As shown in FIG. 4A, the protective method for controlling operation of the machine tool by using the above protective apparatus includes the following steps S401 to S409.

In step S401, the protective apparatus that operates in the correction mode before the saw blade is driven by the driving element is provided.

In step S403, the control unit outputs the first prompting signal for prompting the user to place his or her hand in the front correction region located in front of the saw teeth of the saw blade.

In step S405, the capacitance sensor obtains the reference capacitance.

In step S407, the capacitance sensor senses the first capacitance of the conducting unit that is generated when the hand of the user is in the front correction region without contacting with the saw blade.

In step S409, the control unit calculates the capacitance threshold according to the reference capacitance and the first capacitance, wherein the capacitance threshold is larger than the reference capacitance and smaller than the first capacitance.

Figure 4B:
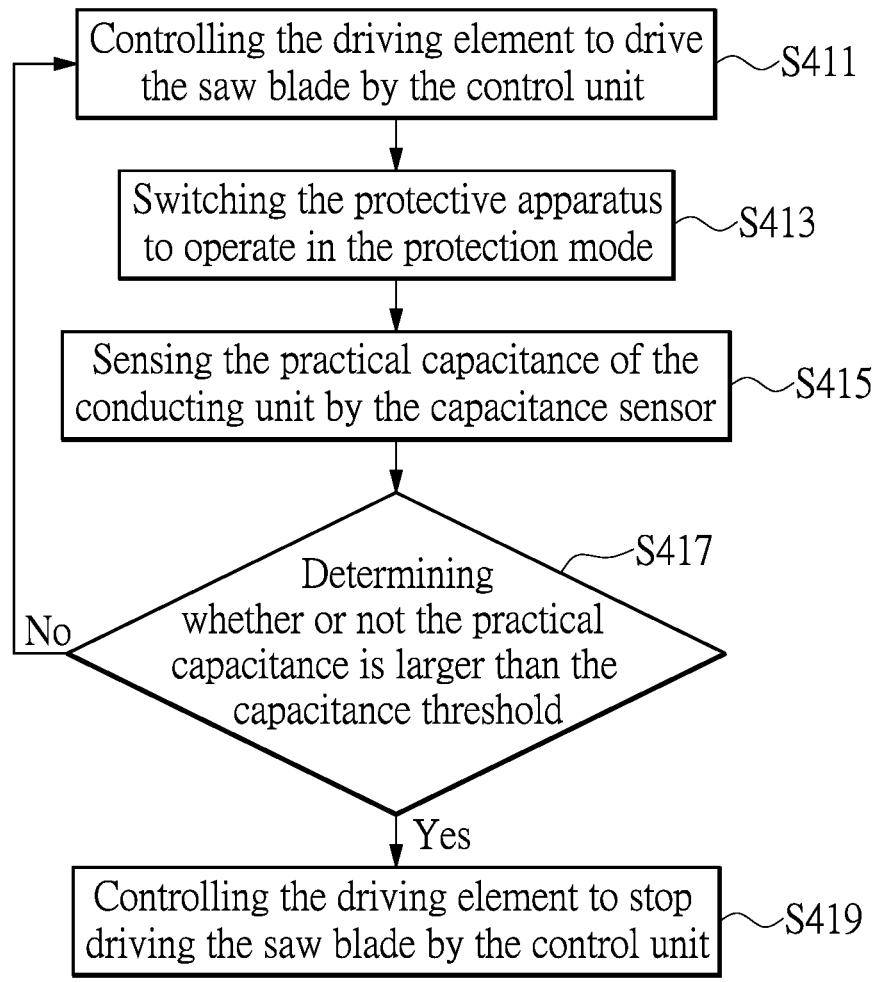
FIG. 4B is a flowchart diagram of the protective method for controlling operation of the machine tool by using the protective apparatus in a protection mode according to the third exemplary embodiment of the present disclosure.

Reference is made to FIG. 4B, which is a flowchart diagram of the protective method for controlling operation of the machine tool by using a protective apparatus in a protection mode according to the third exemplary embodiment of the present disclosure.

As shown in FIG. 4B, the protective method for controlling operation of the machine tool by using the above protective apparatus includes the following steps S411 to S417.

In step S411, the protective apparatus controls the driving element to drive the driving element.

In step S413, when the saw blade is driven by the driving element, the protective apparatus enters the protection mode and the conducting unit maintains contact with the saw blade.

In step S415, the capacitance sensor senses the practical capacitance of the conducting unit that is generated when the user moves his or her hand toward the saw teeth of the saw blade for cutting the object.

In step S417, it is determined whether or not the practical capacitance is larger than the capacitance threshold. If the practical capacitance is determined to be not larger than the capacitance threshold, step S411 is performed again. If the practical capacitance is determined to be larger than the capacitance threshold, step S419 is performed.

In step S419, the control unit of the protective apparatus controls the driving element of the machine tool to stop driving the saw blade.

Figure 5A:
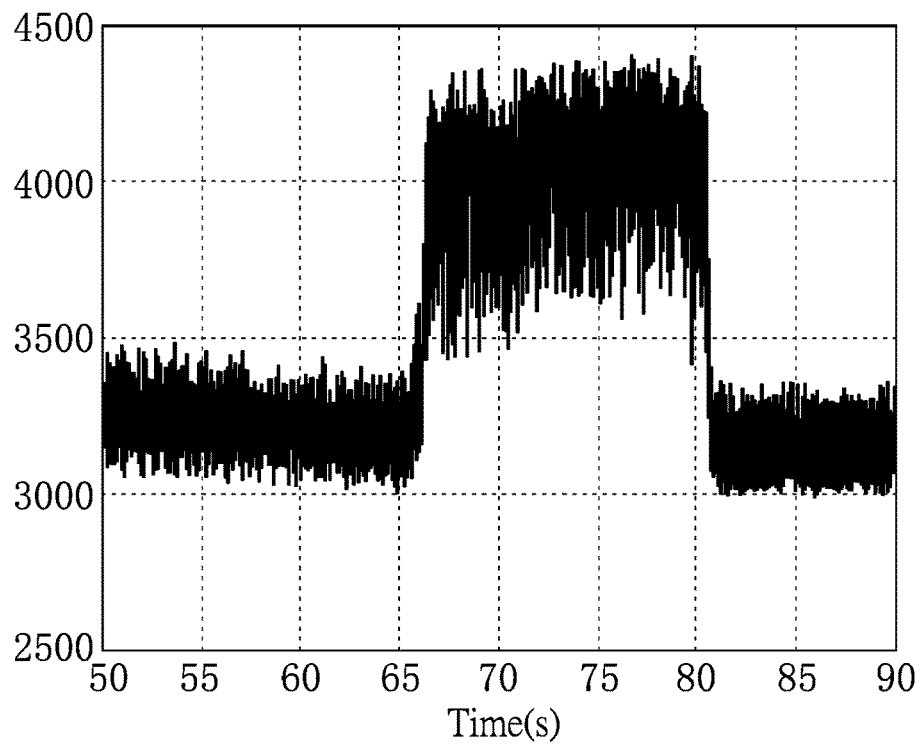
FIG. 5A is a waveform diagram of a sensing signal of a first capacitance of the conducting unit sensed when a distance is about 1 cm between the hand of the user and the operational element according to the exemplary embodiments of the present disclosure.

Reference is made to FIG. 5A, which is a waveform diagram of a sensing signal of a first capacitance of the conducting unit sensed when a distance of about 1 cm is between the hand of the user and the operational element according to the exemplary embodiments of the present disclosure.

As shown in FIG. 5A, a vertical axis represents a reference value that is converted from the mutual capacitance $C_m$, and a horizontal axis represents a time during which the operational element 110 is driven to operate.

When the operational element 110 is driven by the driving element 120 and the distance of about 1 cm is between the operational element and the first correction region R1 in which the user places his or her hand, the capacitance sensor 136 senses the first capacitance of the conducting unit in the to generate the sensing signal indicating the first capacitance of 300 pF.

Figure 5B:
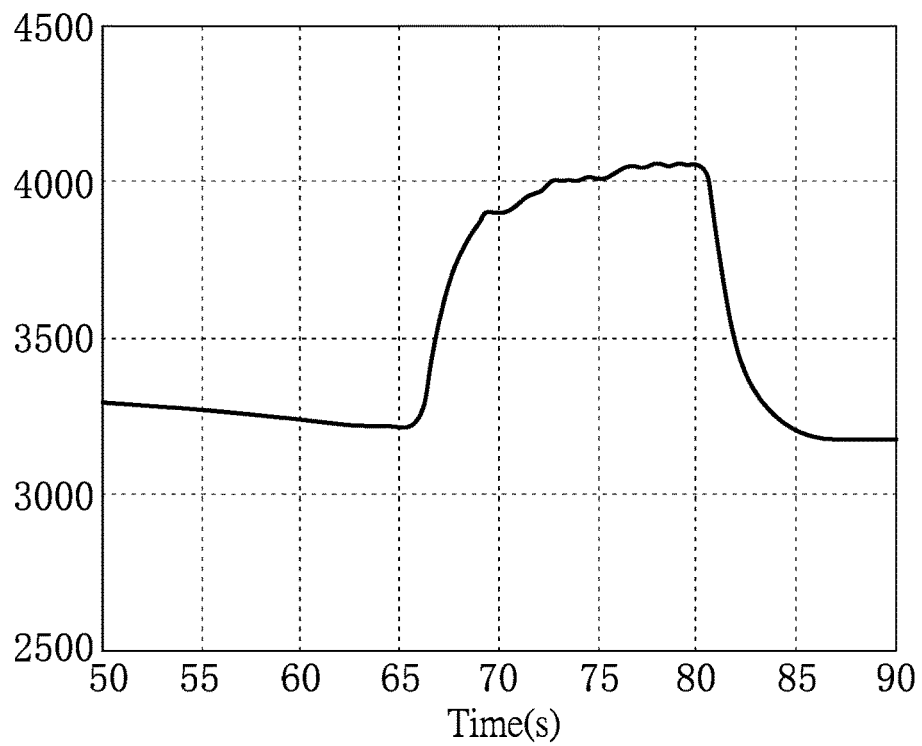
FIG. 5B is a waveform diagram of the filtered sensing signal of the first capacitance of the conducting unit sensed when the distance about 1 cm between the hand of the user and the operational element according to the exemplary embodiments of the present disclosure.

Reference is made to FIG. 5B, which is a waveform diagram of the filtered sensing signal of the first capacitance of the conducting unit sensed when the distance of about 1 cm is between the hand of the user and the operational element according to the exemplary embodiments of the present disclosure.

The sensing signal sensed by the capacitance sensor 136 may be filtered by a filter included in the protective apparatus to generate the filtered sensing signal as shown in FIG. 5B. The control unit can obtain the correct time constant and the capacitance according to the filtered sensing signal.

Figure 6A:
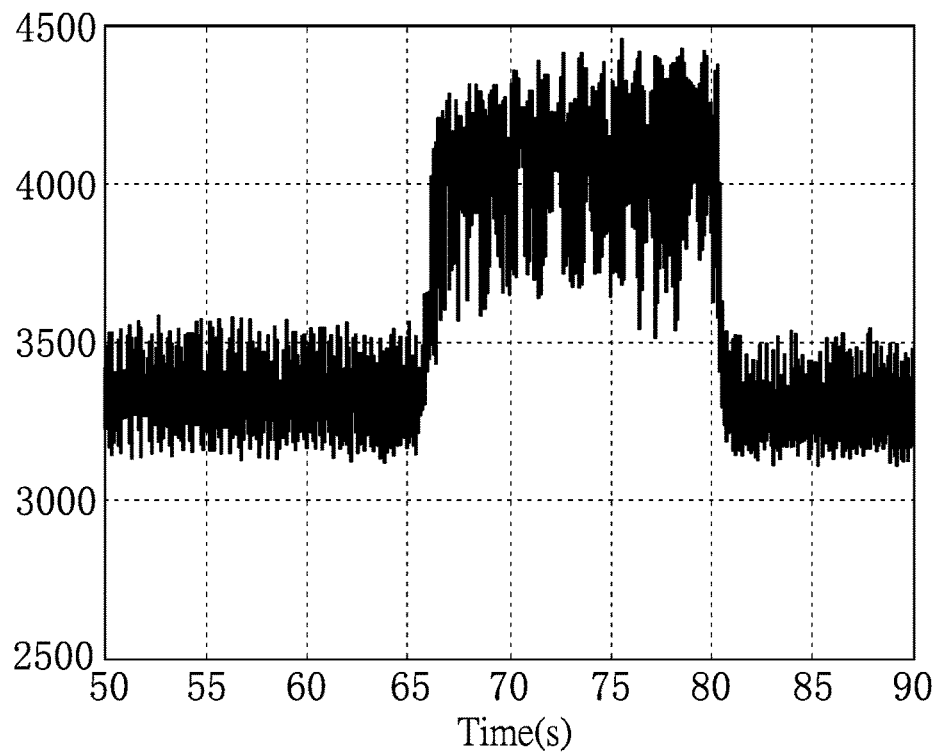
FIG. 6A is a waveform diagram of a sensing signal of the first capacitance of the conducting unit sensed when a distance is about 0.5 cm between the hand of the user and the operational element according to the exemplary embodiments of the present disclosure.

Reference is made to FIG. 6A, which is a waveform diagram of a sensing signal of the first capacitance of the conducting unit sensed when a distance of about 0.5 cm is between the hand of the user and the operational element according to the exemplary embodiments of the present disclosure.

When the operational element 110 is driven by the driving element 120 and the distance of about 0.5 cm is between the operational element and the first correction region R1 in which the user places his or her hand, the capacitance sensor 136 senses the first capacitance of the conducting unit to generate the sensing signal indicating the first capacitance of 460 pF.

Figure 6B:
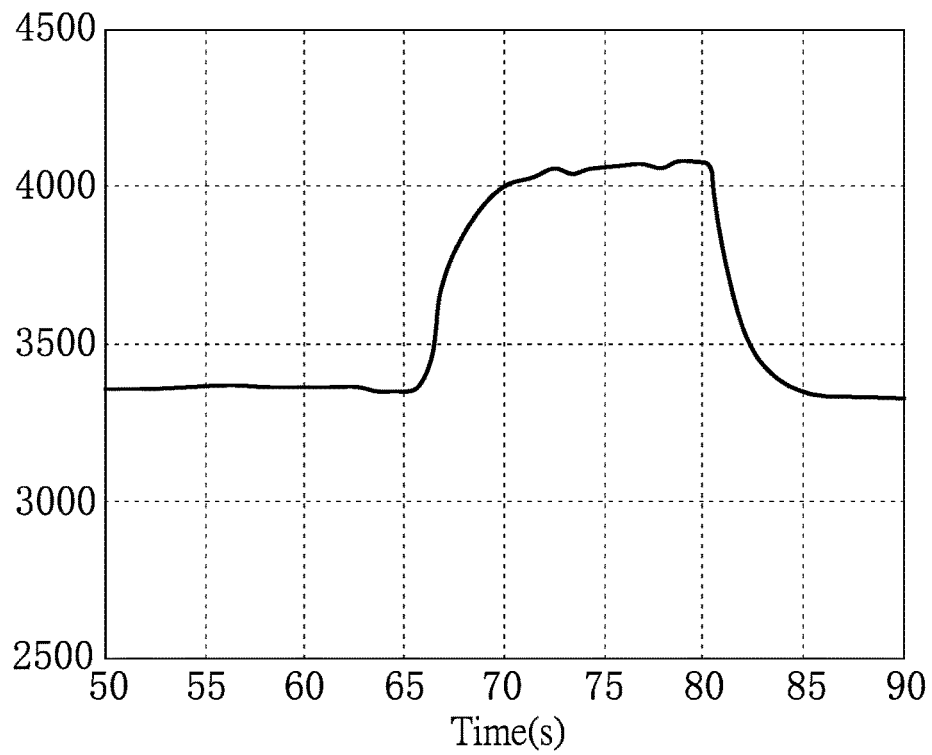
FIG. 6B is a waveform diagram of the filtered sensing signal of the first capacitance of the conducting unit sensed when the distance about 0.5 cm between the hand of the user and the operational element according to the exemplary embodiments of the present disclosure.

Reference is made to FIG. 6B, which is a waveform diagram of the filtered sensing signal of the second capacitance of the conducting unit sensed when a distance of about 0.5 cm is between the hand of the user and the operational element according to the exemplary embodiments of the present disclosure.

The sensing signal sensed by the capacitance sensor 136 may be filtered by the filter included in the protective apparatus to generate the filtered sensing signal as shown in FIG. 6B. The control unit can obtain the correct time constant and the capacitance according to the filtered sensing signal.

As described above, it is apparent that the smaller the distance between the operational element 110 and the hand of the user is, the larger the sensed practical capacitance is.

Figure 7A:
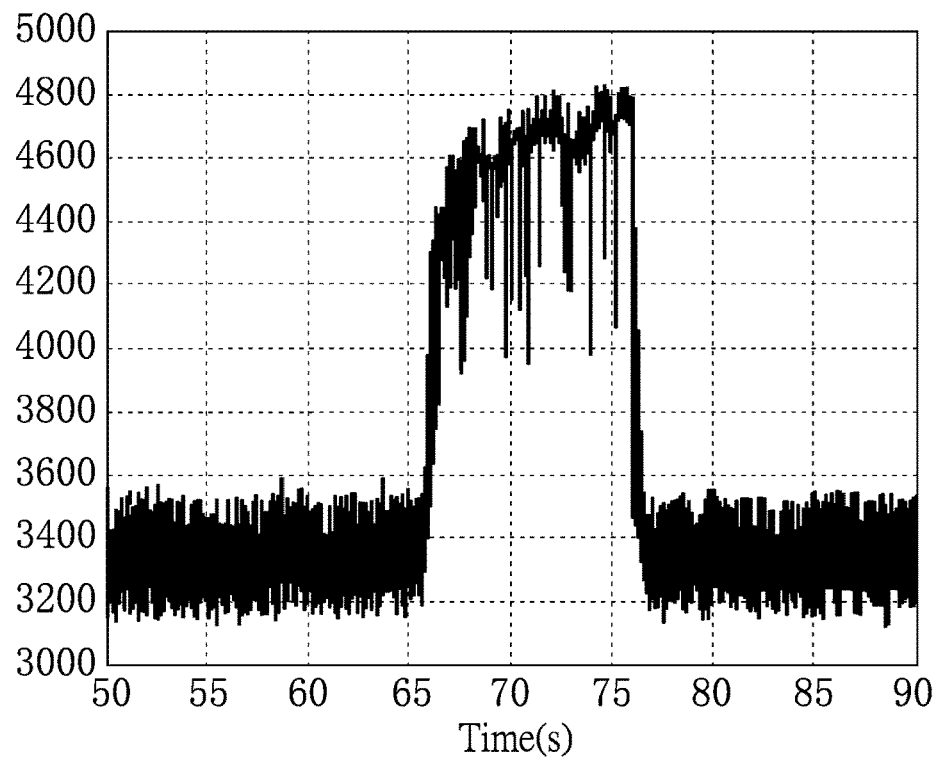
FIG. 7A is a waveform diagram of a second sensing signal of a second capacitance of the conducting unit sensed when a distance is about 1 cm between the hand of the user and the operational element according to the exemplary embodiments of the present disclosure.

Reference is made to FIG. 7A, which is a waveform diagram of a second sensing signal of a second capacitance of the conducting unit sensed when a distance of about 1 cm is between the hand of the user and the operational element according to the exemplary embodiments of the present disclosure.

When the operational element 110 is driven by the driving element 120 and the distance of about 1 cm is between the operational element and the second correction region R2 in which the user places his or her hand, the capacitance sensor 136 senses the second capacitance of the conducting unit to generate the sensing signal indicating the first capacitance of 400 pF.

Figure 7B:
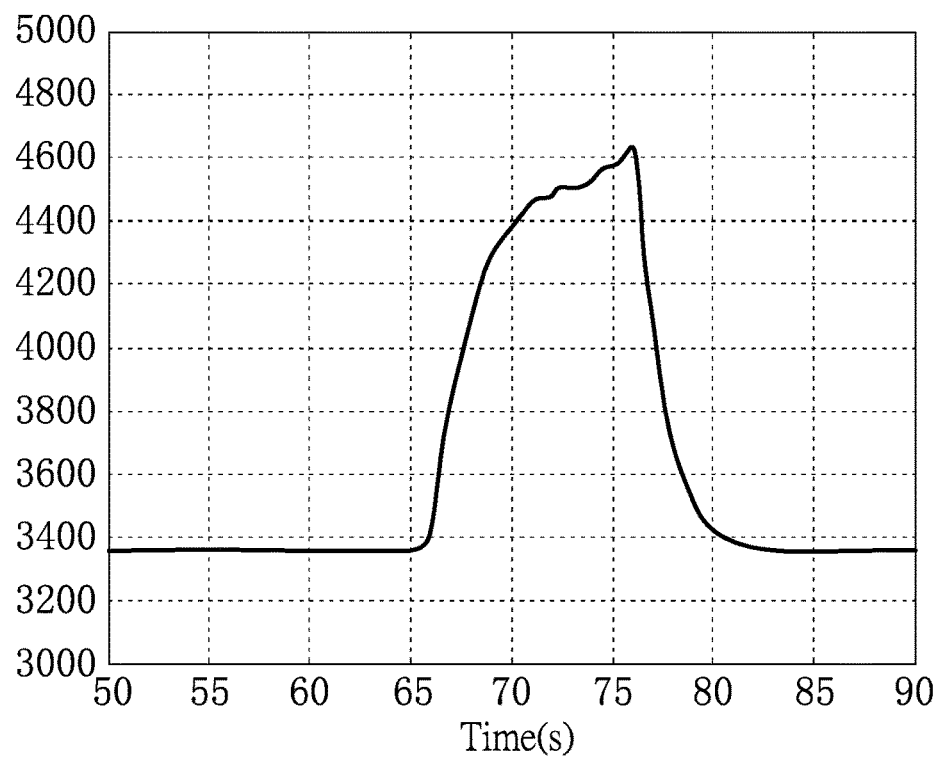
FIG. 7B is a waveform diagram of the filtered second sensing signal of the second capacitance of the conducting unit sensed when the distance about 1 cm between the hand of the user and the operational element according to the exemplary embodiments of the present disclosure.

Reference is made to FIG. 7B, which is a waveform diagram of the filtered second sensing signal of the second capacitance of the conducting unit sensed when the distance of about 1 cm between the hand of the user and the operational element according to the exemplary embodiments of the present disclosure.

The sensing signal sensed by the capacitance sensor 136 may be filtered by the filter included in the protective apparatus to generate the filtered sensing signal as shown in FIG. 7B. The control unit can obtain the correct time constant and the capacitance according to the filtered sensing signal.

Figure 8A:
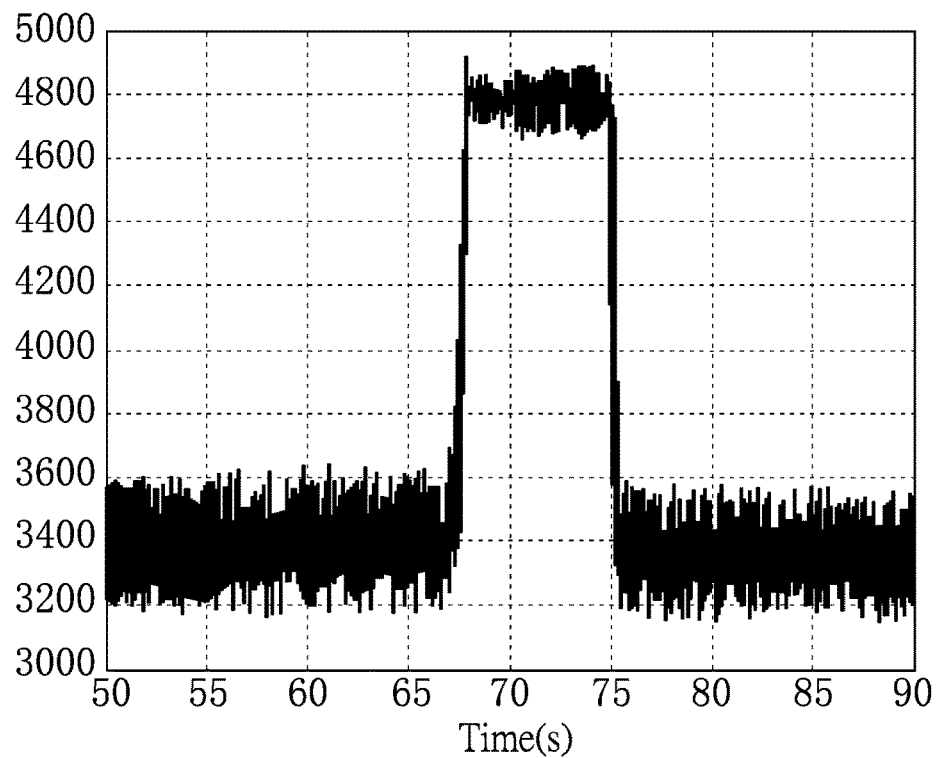
FIG. 8A is a waveform diagram of a second sensing signal of a second capacitance of the conducting unit sensed when a distance is about 0.5 cm between the hand of the user and the operational element according to the exemplary embodiments of the present disclosure.

Reference is made to FIG. 8A, which is a waveform diagram of a second sensing signal of the second capacitance of the conducting unit sensed when a distance of about 0.5 cm is between the hand of the user and the operational element according to the exemplary embodiments of the present disclosure.

When the operational element 110 is driven by the driving element 120 and the distance of about 0.5 cm is between the operational element and the second correction region R2 in which the user places his or her hand, the capacitance sensor 136 senses the second capacitance of the conducting unit to generate the sensing signal indicating the second capacitance of 600 pF.

As described above, it is apparent that the smaller the distance between the operational element 110 and the hand of the user is, the larger the sensed practical capacitance is.

Figure 8B:
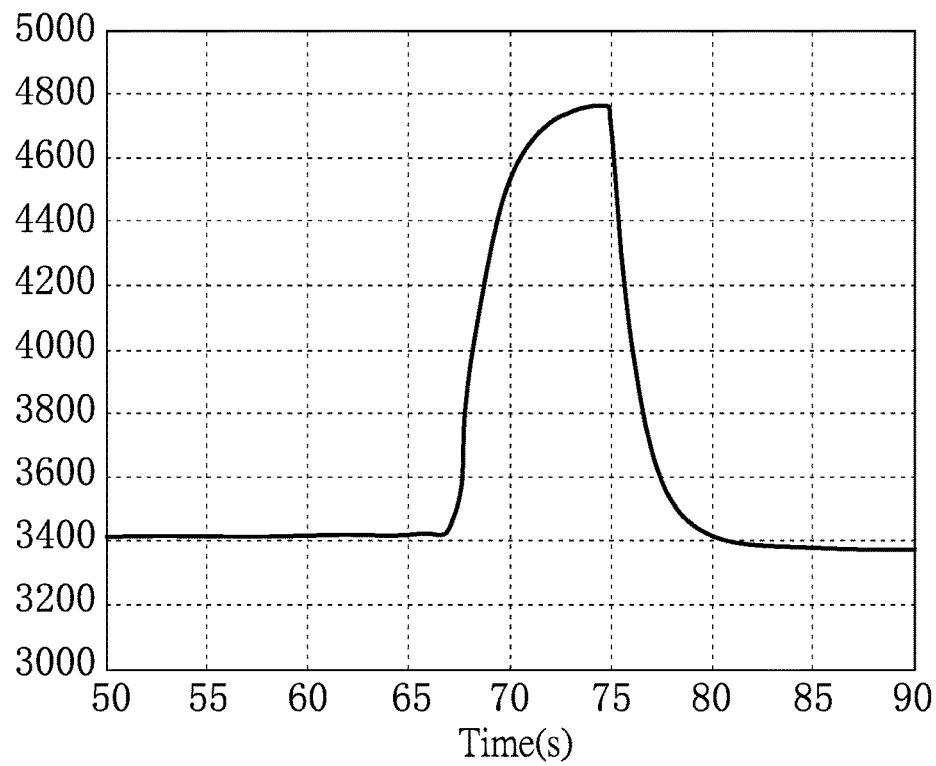
FIG. 8B is a waveform diagram of the filtered second sensing signal of the second capacitance of the conducting unit sensed when the distance about 0.5 cm between the hand of the user and the operational element according to the exemplary embodiments of the present disclosure.

Reference is made to FIG. 8B, which is a waveform diagram of the filtered second sensing signal of the second capacitance of the conducting unit sensed when the distance of about 0.5 cm is between the hand of the user and the operational element according to the exemplary embodiments of the present disclosure.

The sensing signal sensed by the capacitance sensor 136 may be filtered by the filter included in the protective apparatus to generate the filtered sensing signal as shown in FIG. 8B. The control unit can obtain the correct time constant and the capacitance according to the filtered sensing signal.

Figure 9:
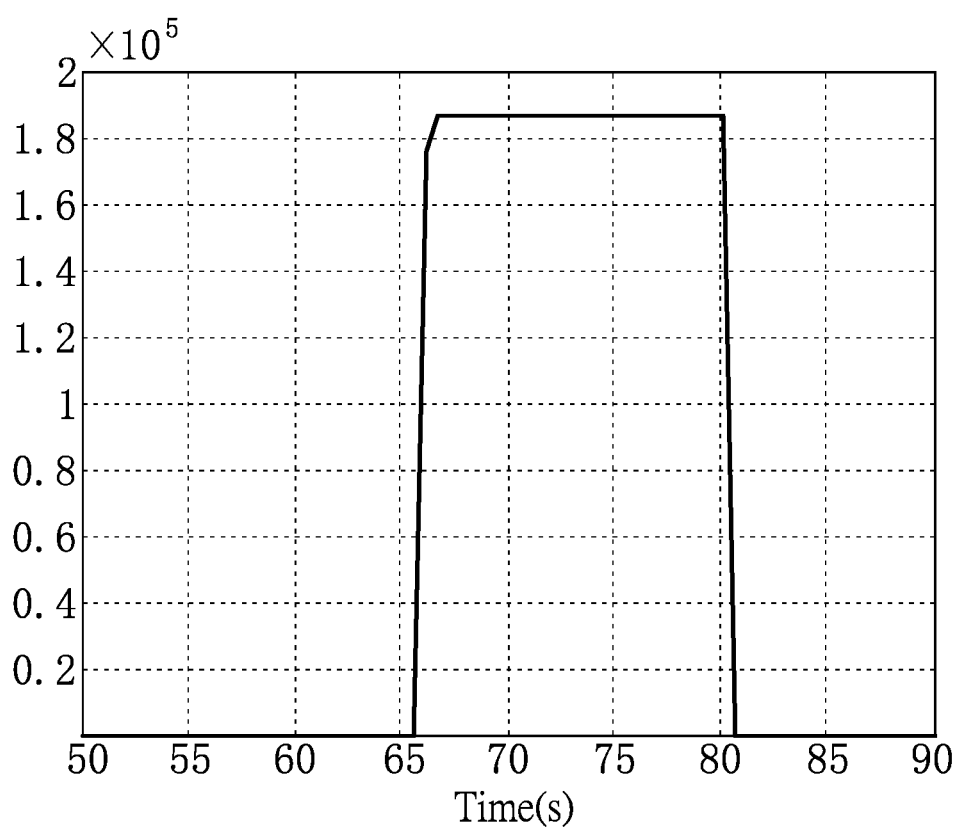
FIG. 9 is a waveform diagram of a capacitance of the conducting unit sensed when the hand of the user being in contact with the operational element according to the exemplary embodiments of the present disclosure.

Reference is made to FIG. 9, which is a waveform diagram of a capacitance of the conducting unit sensed when the hand of the user is in contact with the operational element according to the exemplary embodiments of the present disclosure.

When the operational element 110 is driven by the driving element 120 and the hand of the user is in contact with the operational element 110, the capacitance sensor 136 senses the capacitance of the conducting unit to generate the sensing signal indicating the capacitance of 95.8 mF, wherein the sensed capacitance may be as the reference capacitance.

In summary, for the protective apparatus and the machine tool of the present disclosure, a capacitance sensor and an operational element are electrically connected with each other, so that the capacitance sensor does not have the blind spot problem for the capacitance sensor configuring the different position of the operational element. Therefore, when the user uses a machine tool, the protective apparatus and the machine tool can reduce the probability of harm.

The above-mentioned descriptions represent merely the exemplary embodiment of the present disclosure, without any intention to limit the scope of the present disclosure thereto. Various equivalent changes, alterations or modifications based on the claims of present disclosure are all consequently viewed as being embraced by the scope of the present disclosure.

What is claimed is:

1. A protective apparatus, adapted for a machine tool, the machine tool including a driving element and a saw blade, the driving element used for driving the saw blade, and the protective apparatus comprising:
   an insulating unit, configured between the saw blade and the driving element, and the driving element driving the saw blade through the insulating unit;
   a conducting unit, being in direct contact with the saw blade;
   a capacitance sensor, electrically connected to the conducting unit; and
   a control unit, electrically connected to the capacitance sensor and the driving element;
   wherein before the saw blade is driven by the driving element, the protective apparatus operates in a correction mode, the control unit outputs a first prompting signal for prompting a user to place his or her hand in a front correction region located in front of saw teeth of the saw blade, the capacitance sensor obtains a reference capacitance and senses a first capacitance of the conducting unit that is generated when the user's hand is in the front correction region without contacting with the saw blade, the control unit calculates a capacitance threshold according to the reference capacitance and the first capacitance, the capacitance threshold being larger than the reference capacitance and smaller than the first capacitance;
   wherein when the saw blade is driven by the driving element, the conducting unit maintains contact with the saw blade, the user moves his or her hand toward the saw teeth of the saw blade for cutting an object, the protective apparatus enters a protection mode, the capacitance sensor senses a practical capacitance of the conducting unit, the control unit compares the practical capacitance and the capacitance threshold; and
   wherein when the control unit determines that the practical capacitance is larger than the capacitance threshold, the control unit controls the driving element to stop driving the saw blade.

2. The protective apparatus according to claim 1, wherein before the saw blade is driven by the driving element and the hand of the user is in contact with the saw blade, the capacitance sensor senses a capacitance of the conducting unit as the reference capacitance.

3. The protective apparatus according to claim 1, wherein when the protective apparatus operates in the correction mode, the control unit outputs a second prompting signal for prompting the user to place his or her hand in a side correction region located near a surface of a body of the saw blade, the capacitance sensor senses a second capacitance of the conducting unit that is generated when the hand is in the side correction region without contacting with the saw blade, the control unit calculates the capacitance threshold according to the reference capacitance, the first capacitance and second capacitance, the capacitance threshold is smaller than the second capacitance.

4. The protective apparatus according to claim 1, wherein the conducting unit includes liquid mercury as a conductive medium.

5. The protective apparatus according to claim 1, wherein the conducting unit is a bearing and sleeves around the insulating unit, the bearing has a holding portion and a linking portion configured to the holding portion, the linking portion contacts the saw blade, and the holding portion electrically connected to the capacitance sensor.

6. The protective apparatus according to claim 5, wherein the linking portion of the bearing is fixed to the insulating unit and the insulating unit is configured between the bearing and the driving element, so that the bearing is insulated from the driving element.

7. The protective apparatus according to claim 1, wherein the driving element is a motor, the saw blade and the insulating unit are configured to a drive shaft of the motor, and the insulating unit is configured between the drive shaft and the saw blade, so that the drive shaft is insulated from the saw blade.

8. A machine tool, comprising:
a saw blade, configured to a machine table;
a driving element, configured to the machine table and used for driving the saw blade; and
a protective apparatus, including:
an insulating unit, configured between the saw blade and the driving element, and the driving element driving the saw blade through the insulating unit;
a conducting unit, being in direct contact with the saw blade;
a capacitance sensor, electrically connected to the conducting unit; and
a control unit, electrically connected to the capacitance sensor and the driving element;
wherein before the saw blade is driven by the driving element, the protective apparatus operates in a correction mode, the control unit outputs a first prompting signal for prompting a user to place his or her hand in a front correction region located in front of saw teeth of the saw blade, the capacitance sensor obtains a reference capacitance and senses a first capacitance of the conducting unit that is generated when the user's hand is in the front correction region without contacting with the saw blade, the control unit calculates a capacitance threshold according to the reference capacitance and the first capacitance, the capacitance threshold is larger than the reference capacitance and smaller than the first capacitance;
wherein when the saw blade is driven by the driving element, the conducting unit maintains contact with the saw blade, the user moves his or her hand toward the saw teeth of the saw blade for cutting an object, the protective apparatus enters a protection mode, the capacitance sensor senses a practical capacitance of the conducting unit, the control unit compares the practical capacitance and the capacitance threshold; and
wherein when the control unit determines that the practical capacitance is larger than the capacitance threshold, the control unit controls the driving element to stop driving the saw blade.

9. The machine tool according to claim 8, wherein before the saw blade is driven by the driving element and the hand of the user is in contact with the saw blade, the capacitance sensor senses a capacitance of the conducting unit as the reference capacitance.

10. The machine tool according to claim 8, wherein when the protective apparatus operates in the correction mode, the control unit outputs a second prompting signal for prompting the user to place his or her hand in a side correction region located near a surface of a body of the saw blade, the capacitance sensor senses a second capacitance of the conducting unit that is generated when the user's hand is placed in the side correction region without contacting with the saw blade, the control unit calculates the capacitance threshold according to the reference capacitance, the first capacitance and second capacitance, the capacitance threshold is smaller than the second capacitance.

11. The machine tool according to claim 8, wherein the driving element is a motor, the saw blade and the insulating unit is configured to a drive shaft of the motor, and the insulating unit is configured between the drive shaft and the saw blade, so that the drive shaft is insulated from the saw blade.

12. The machine tool according to claim 8, wherein the conducting unit includes liquid mercury as a conductive medium.

* * * * *